2,738,282
POLISHING COMPOSITION

Edgar Kingdon Hamilton, Merrick, N. Y.

No Drawing. Application November 5, 1951,
Serial No. 254,976

2 Claims. (Cl. 106—8)

This invention relates to a novel composition useful for polishing wooden, metal, leather and plastic surfaces and more particularly for polishing and protecting exposed wooden and leather surfaces of furniture, linoleum and wooden floors and to its method of preparation.

It has been found previously that aqueous emulsions of waxes may be used as furniture polishes. When applied to furniture and after prolonged rubbing these polishes may yield an attractive, glossy surface. However, this type of surface dulls quickly; also because of its tackiness, the surface serves as a sticky media for dust particles. Consequently, frequent dusting and polishing is requisite for maintenance of such a polished surface. Most furniture polishes are oil-wax emulsions, water-wax-solvent emulsions or paste waxes. Polishes containing oils usually give a very transient gloss presumably due to absorption into the surface to be polished and in the case of wood leads to a mottled (uneven) appearance on standing due to differing rates of penetration into grained and ungrained portions of the wooden surface. Polishes containing waxes are characterized by the need for considerable rubbing action, an appreciable drying period and a further vigorous rubbing action to produce a glossy surface; this type of glossy surface is attributed to a relatively thick, filmy layer which characteristically partially obscures the surface thereby particularly in the case of wood, obscuring the beauty of the natural grain of the wood.

While automobile polishes containing polysiloxanes and silica in an aqueous emulsion have been shown to produce a glossy surface on automobile lacquers, this type of composition is deleterious and is especially not useful for water receptive surfaces such as worn areas of finished wooden furniture which, due to its grain picks up water unevenly to yield a rough surface.

It is an object of this invention to provide a polish which produces a hard, glazed surface which retains its luster for more than a month.

It is a further object of this invention to provide a polish which produces a hard, glazed finish which is resistant to scratching and which has little tendency to cause adherence of dust particles.

It is a further object of this invention to provide a polish which produces a hard, glazed finish on natural, varnished or waxed woods and which tends to emphasize the natural grain of the wood and to mask scratches, imperfections and the like.

It is a further object of this invention to provide a polish capable of imparting an unusually high gloss and exceptionally durable protective finish to various surfaces, particularly to wood, leather and plastic finishes, with a minimum of manual labor.

I have found that the aforesaid objects can be accomplished, i. e. a non-tacky, hard, smooth, uniform, glossy, water-repellent surface can be produced by polishing wooden, metal, leather or plastic surfaces with a minimum of effort by application thereto of a composition of a polysiloxane, a solvent for the polysiloxane, an unsaturated triglyceride oil and a vegetable wax.

The organopolysiloxanes employed in this invention are those in which the organic groups are hydrocarbon radicals attached to silicon through a carbon-silicon linkage, and having from one to three hydrocarbon radicals per silicon atom. These hydrocarbon radicals are for example, alkyl, such as methyl, ethyl, propyl, octadecyl and the like, aryl such as phenyl, tolyl, chlorophenyl, xenyl and the like and aralkyl such as benzyl. The contemplated polysiloxanes include those described in U. S. 2,390,378, U. S. 2,397,727, U. S. 2,442,212, U. S. 2,446,135, U. S. 2,447,611 and the like. I prefer polysiloxanes containing at least one lower alkyl group per silicon atom such as for example a methylpolysiloxane such as dimethylpolysiloxane.

The polysiloxanes may vary from low viscosity liquids to semi-solids or solids. I prefer fluid polysiloxanes having a viscosity in the range of 5 to 200 centistokes at 25° C.

The subject polysiloxanes, which are also designated as silicone polymers or resins are colorless, odorless hydrophobic oils. They are heat resistant and flame resistant. They possess low volatility and negligible vapor characteristics and they are inert physiologically. They are resistant to oxidation and do not corrode metals. All of the aforesaid properties of these polysiloxanes make them attractive for use in furniture polish compositions. The polysiloxanes are readily soluble in many organic solvents including hydrocarbons and halogenated hydrocarbons. However, neither the polysiloxanes per se, nor the polysiloxanes dissolved in a suitable solvent are compositions useful as a furniture polish. For example, if a dimethylpolysiloxane dissolved in a mixture of carbon tetrachloride and naphtha, is applied to a varnished wooden surface, the solvent evaporates to leave a myriad of highly glossy specks. While vigorous manual rubbing of the surface will yield a glossy finish, this latter effect is temporary and on standing the specks will reappear or the final gloss will change to an undesirable streaky finish.

As a solvent useful in my polish composition, any solvent of acceptable volatility, capable of dissolving the components particularly the polysiloxane component of the polish composition and having no deleterious effect on a varnished surface appear to be useful. However, the preferred solvents for my polishing composition are somewhat volatile non-polar liquids, particularly those having a boiling point in the range of 75° C. to 275° C. including carbon tetrachloride, trichloroethylene, tribromoethylene, ligroin, petroleum spirits, naphtha, gasolene, benzene, perchloroethylene and the like. In order to reduce the flash point of my polishing composition I prefer to use polyhalogenated aliphatic solvents or mixtures containing a relatively high proportion of these solvents. My prefered solvent composition is about two-thirds by weight carbon tetrachloride and about one-third by weight naphtha.

In order to obtain a polish composition which is capable of yielding on varnished wood, an even, glossy finish which does not become uneven (i. e. dull or mottled) along the wood grain on standing for several days, it was found necessary to include in the polish formulation an unsaturated fatty acid triglyceride oil. The preferred oils are caster oil and croton oil which contain a preponderance of ricinoleic acid in the form of a mixed triglyceride ester. However, I am not restricted to oils having ricinoleic acid as the unsaturated fatty acid component, since one can use in my polish oils such as linseed oil, tung oil, soybean oil, rapeseed oil and the like, which contain polyunsaturated fatty acids such as linoleic, linolenic, eleostearic acids and the like. Most of the oils named are drying oils; it is well-known that unsaturated fatty acid triglyceride oils are susceptible to oxidation in the presence of air. Raw castor oil, while not considered as a drying oil in the usual sense, is useful in my polish. Dehydrated castor oil, also useful in my composition, has good drying properties, presumably due to the additional double bond formed by loss of the elements of water from ricinoleic acid chains. Heat bodied unsaturated fatty acid triglyceride oils are also useful in my invention. I prefer to use a pale blown oil, preferably castor oil which is a partially oxidized oil which retains relatively high solubility in non-polar solvents.

While the aforesaid mixtures containing raw castor oil yield suitable polishing compositions, I prefer to use a pale blown castor oil which has a viscosity in the range of that of raw castor oil, about 130 seconds Saybolt at 100° F. to above 400 seconds Saybolt at 100° F. It is not necessary that the oil be of this particular type, since raw or heavier blown castor oils may be used in the polishing composition. One may also use raw croton oil, raw rapeseed oil or chemically treated castor oil, croton oil, tung oil or rapeseed oil, which have been processed by nitration, sulphur chloride treatment or partial hydrogenation of raw or blown oils.

Immediately after application to a wooden surface, I find that a furniture polish composition of a polysiloxane, a solvent for the polysiloxane and an unsaturated acid triglyceride oil yields a glossy, somewhat-oily finish. After standing several days, however, a mottled effect may be noticed. I have found that the addition of a vegetable wax to the composition yields a polish that gives a desirable glossy, non-oily surface. While many of the common vegetable waxes are useful in my composition, I prefer to use a vegetable wax of the carnauba wax type.

Waxes which may be used in my polishing composition are not necessarily soluble in the remainder of the mixture. The wax is present in low concentration in my polishing composition and the precipitated wax is re-emulsified readily by shaking. I prefer to use carnauba wax in my composition preferably in the presence of a lesser quantity of beeswax; the latter appears to act as a plasticizer for the carnauba wax. The function of the carnauba wax is the improvement of the hardness and luster of the polished layer. The additions of paraffin wax to my composition reduces unit cost while improving luster; and tends to control the consistency of the carnauba wax in the solvent. Ozokerite and other amorphous waxes have excellent binding properties and tend to lessen the crystallization of certain amounts of the crystalline waxes.

While a vegetable wax (such as carnauba wax, candelilla wax, bayberry wax; Japan wax and the like) is useful by itself in my polishing composition, I find that superior polishes are obtained by mixing with the vegetable wax a smaller proportionate amount of a mineral wax (such as paraffin wax, ozokerite, montan wax, microcrystalline wax and the like), an animal wax (spermaceti, beeswax, Chinese wax and the like), or a synthetic wax (such as cetyl alcohol, stearic acid, acrawax and the like).

To the mixture of polysiloxane, solvent for the polysiloxane, vegetable wax and unsaturated triglyceride oil, one may add a small proportion of a wetting agent (such as a metal salt of sulfated fatty acid ester, such as Ahcowet RS of Arnold-Hoffman & Co.) which is useful in that it increases somewhat the spreading characteristics of the furniture polish but is not essential to the composition.

In regard to possible variations of the concentrations of components of a suitable polishing composition, one may use 1 to 20 parts by weight of the halogenated-hydrocarbon-soluble organopolysiloxane having from 1 to 3 hydrocarbon radicals per silicon atom, from 40 to 160 parts by weight of a non-polar solvent for the organopolysiloxane, from 1 to 10 parts of an unsaturated fatty acid triglyceride oil, from 1 to 7 parts by weight of a vegetable wax, from 0 to 3 parts by weight of a non-vegetable wax (mineral wax, animal wax, synthetic wax).

Surfaces treated with my polishing composition are very resistant to marking by alcoholic beverages, presumably due to the fact that the polysiloxanes used in my polish are insoluble in ethanol. This property is of great importance in the case of wooden serving trays, cocktail tables, end tables and the like.

The following examples, in which parts are by weight, serve to illustrate the invention.

*Example 1*

A polishing composition was obtained by heating to 60 to 70° C. a mixture of 72 parts by weight naptha (Socony-vacuum No. 4), 41 parts by weight carbon tetrachloride, 5 parts by weight of a 100 centistoke dimethylpolysiloxane fluid and 5 parts by weight of a pale blown castor oil until a clear solution resulted which was then allowed to cool to room temperature.

The polishing composition was applied to a previously unpolished varnished mahogany wood test panel with a clean, soft cloth pad by wiping the object to be polished with the pad, using light strokes parallel to the grain until the surface was evenly coated with a visible film. An even, glossy finish is obtained by gently wiping the surface with a soft clean cloth. After 5 days, the surface was glossy, but mottling (dulling) along the grain was noted.

*Example 2*

A polishing composition was prepared as in Example 1 except that there was added one part by weight of Ahcowet RS. On polishing a mahogany wood panel, an even, glossy finish resulted. After 5 days, the finish was glossy, but fine mottling along the grain was noted.

*Example 3*

A mixture of 41 parts by weight naptha, 72 parts by weight carbon tetrachloride and 5 parts by weight 100 centistoke dimethylpolysiloxane was heated to 60–70° C. To this solution with stirring was slowly added a melted mixture of 2 parts by weight carnauba wax and 0.4 part by weight beeswax. The resultant mixture was chilled to 25° C.

On polishing a mahogany wood panel, an even, but dull gloss resulted. After 5 days, the dull gloss persisted and no mottling was noted.

*Example 4*

A mixture of 72 parts by weight carbon tetrachloride, 41 parts by weight naphtha, 5 parts by weight 100 centistoke dimethylpolysiloxane, 5 parts by weight pale blown castor oil, 1 part by weight Ahcowet RS (65% active sodium salt of a sulfated fatty acid ester produced by Arnold-Hoffman & Co.), was heated with mechanical stirring to 70° C. until solution occurred. To this solution was slowly added with vigorous agitation a melt of 2 parts by weight carnauba wax (yellow No. 1). The resultant mixture was stirred until clear and then cooled to room temperature rapidly, thereby obtaining a fine suspension of wax. Although the polishing composition separates somewhat on standing, slight agitation resuspends the separated portion.

A satisfactory semi-permanent finish resulted on polishing a mahogany test sample.

*Example 5*

A superior polishing composition was prepared as in Example 4 except that 0.4 part beeswax was added to the carnauba wax before melting and addition of the mixed wax melt to the solvent-silicone mixture.

A mahogany panel polished with this composition yielded a glossy even finish which did not alter on standing and which gave no indication of mottling. It is to be especially noted that this polishing composition yields a brilliant, hard non-oily, non-mottling finish on surfaces of wood, plastic and metal rapidly and with a minimum of gentle buffing. The finish is regarded as semipermanent since it remains bright for a month to six weeks.

Example 6

A sample of the polishing composition of Example 5 was allowed to stand for one month and the precipitate removed by filtration. On polishing a mahogany test panel with the filtrate, an even, glossy finish resulted. After standing for five days, slight mottling was noted in the glossy finish.

Example 7

A satisfactory polishing composition was prepared as in Example 5 except that 5 parts by weight 200 centistoke (25° C.) dimethylpolysiloxane was used in place of 5 parts of 100 centistoke (25° C.) dimethylpolysiloxane.

Example 8

A satisfactory polishing composition was prepared as in Example 5 except that 4 parts by weight of 200 centistoke copolymeric fluid containing trimethylsiloxane and phenylmethylsiloxane was used in place of 5 parts of dimethylpolysiloxane.

Example 9

A satisfactory polishing composition was prepared as in Example 5 except that 100 parts by weight carbon tetrachloride was used as the solvent in place of the mixture of 72 parts of carbon tetrachloride and 41 parts of naphtha.

Example 10

A satisfactory polishing composition was prepared as in Example 5 except that 5 parts by weight of a 400 centistoke butylmethylpolysiloxane was employed in place of the dimethylpolysiloxane.

Various modifications can be made in carrying out my invention, and it is to be understood that the invention is not limited to the modifications thereof which are specifically pointed out or described except as limited by the appended claims.

I claim:

1. A polishing composition consisting essentially of from 1 to 20 parts by weight of a halogenated-hydrocarbon-soluble-organopolysiloxane having from 1 to 3 hydrocarbon radicals per silicon atom, said radicals being selected from the group consisting of aryl, alkyl and aralkyl radicals; from 40 to 160 parts by weight of a solvent for the organopolysiloxane, said solvent being selected from the group of hydrocarbons and halogenated hydrocarbons; from 1 to 10 parts of a pale blown castor oil; from 1 to 7 parts by weight of a mixture of carnauba wax and beeswax; and less than 2 parts by weight of an anionic sulfated aliphatic wetting agent.

2. A polishing composition consisting essentially of 72 parts by weight carbon tetrachloride, 41 parts by weight naphtha, 5 parts by weight dimethylpolysiloxane having a viscosity of 100 centistokes at 25° C., 5 parts by weight pale blown castor oil, 1 part by weight of a sodium salt of a sulfated fatty acid ester, 2 parts by weight carnauba wax and 0.4 part by weight beeswax.

References Cited in the file of this patent

UNITED STATES PATENTS

| | | |
|---|---|---|
| 2,214,263 | Weike, Jr. | Sept. 10, 1940 |
| 2,335,324 | Tumbler | Nov. 30, 1943 |
| 2,383,521 | Sowa | Aug. 21, 1945 |
| 2,404,896 | Dayton | July 30, 1946 |
| 2,523,281 | Currie | Sept. 26, 1950 |
| 2,527,793 | Bump | Oct. 31, 1950 |
| 2,584,413 | Baer et al. | Feb. 5, 1952 |
| 2,614,049 | Swanson | Oct. 14, 1952 |
| 2,626,870 | Cooke et al. | Jan. 27, 1953 |